United States Patent
Fong et al.

(10) Patent No.: US 11,663,509 B2
(45) Date of Patent: May 30, 2023

(54) SYSTEM AND METHOD FOR A PERSONALIZED MACHINE LEARNING PIPELINE SELECTION AND RESULT INTERPRETATION

(71) Applicant: EMC IP Holding Company LLC, Hopkinton, MA (US)

(72) Inventors: Victor Fong, Medford, MA (US); Megan A. Murawski, Belmont, MA (US); Amy N. Seibel, Cambridge, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 281 days.

(21) Appl. No.: 16/777,964

(22) Filed: Jan. 31, 2020

(65) Prior Publication Data
US 2021/0241152 A1     Aug. 5, 2021

(51) Int. Cl.
*G06N 7/01* (2023.01)
*G06N 20/00* (2019.01)

(52) U.S. Cl.
CPC ............. *G06N 7/01* (2023.01); *G06N 20/00* (2019.01)

(58) Field of Classification Search
CPC ........ G06N 20/00; G06N 20/10; G06N 20/20; G06N 7/005; G06N 7/00; G06N 5/02; G06N 5/04; G06N 5/00; G06N 7/01
See application file for complete search history.

(56) References Cited

U.S. PATENT DOCUMENTS

| 2018/0211333 A1* | 7/2018 | Lackman | G06K 9/4604 |
| 2020/0401950 A1* | 12/2020 | Han | G06K 9/6262 |
| 2021/0065048 A1* | 3/2021 | Salonidis | G06F 9/542 |

OTHER PUBLICATIONS

Yang et al. ("Oboe: Collaborative Filtering for AutoML Model Selection"), Aug. 2019 https://dl.acm.org/doi/pdf/10.1145/3292500.3330909 (Year: 2019).*
Laadan et al. ("RankML: Meta Learning-Based Approach for Pre-Ranking Machine Learning Pipelines"), Nov. 2019 https://arxiv.org/pdf/1911.00108.pdf (Year: 2019).*
Olson et al. "Evaluation of a Tree-based Pipeline Optimization Tool for Automating Data Science", Jul. 2016 https://dl.acm.org/doi/pdf/10.1145/2908812.2908918 (Year: 2016).*

\* cited by examiner

*Primary Examiner* — Kamran Afshar
*Assistant Examiner* — Shoun J Abraham
(74) *Attorney, Agent, or Firm* — Chamberlain, Hrdlicka, White, Williams & Aughtry

(57) ABSTRACT

A method for managing data includes obtaining a request for a machine learning (ML) pipeline selection from a client, wherein the request comprises a training dataset and a domain of the training dataset, and in response to the request: identifying a set of ML pipelines based on the domain, obtaining runtime statistics for the set of ML pipelines using the domain and at least a portion the training dataset, generating, using a user preference model, an ordering of the set of ML pipelines based on the runtime statistics and user preferences, and presenting the ordering, the runtime statistics, and a notification based on the ordering to the client.

17 Claims, 6 Drawing Sheets

SYSTEM AND METHOD FOR A PERSONALIZED MACHINE LEARNING PIPELINE SELECTION AND RESULT INTERPRETATION

BACKGROUND

Computing devices may include functionality for executing computing instructions to process data. A user that prompts the computing devices to execute such computing instructions may desire to personalize the computing instructions based on the accuracy of the results, the infrastructure in which the computing devices are executing, and the cost to execute such computing instructions.

SUMMARY

In general, in one aspect, the invention relates to a method for managing data. The method includes obtaining a request for a machine learning (ML) pipeline selection from a client, wherein the request comprises a training dataset and a domain of the training dataset, and in response to the request: identifying a set of ML pipelines based on the domain, obtaining runtime statistics for the set of ML pipelines using the domain and at least a portion the training dataset, generating, using a user preference model, an ordering of the set of ML pipelines based on the runtime statistics and user preferences, and presenting the ordering, the runtime statistics, and a notification based on the ordering to the client.

In general, in one aspect, the invention relates to a system that includes a processor and memory that includes instructions which, when executed by the processor, perform a method. The method includes obtaining a request for a machine learning (ML) pipeline selection from a client, wherein the request comprises a training dataset and a domain of the training dataset, and in response to the request: identifying a set of ML pipelines based on the domain, obtaining runtime statistics for the set of ML pipelines using the domain and at least a portion the training dataset, generating, using a user preference model, an ordering of the set of ML pipelines based on the runtime statistics and user preferences, and presenting the ordering, the runtime statistics, and a notification based on the ordering to the client.

In general, in one aspect, the invention relates to a non-transitory computer readable medium that includes computer readable program code, which when executed by a computer processor enables the computer processor to perform a method for managing data. The method includes obtaining a request for a machine learning (ML) pipeline selection from a client, wherein the request comprises a training dataset and a domain of the training dataset, and in response to the request: identifying a set of ML pipelines based on the domain, obtaining runtime statistics for the set of ML pipelines using the domain and at least a portion the training dataset, generating, using a user preference model, an ordering of the set of ML pipelines based on the runtime statistics and user preferences, and presenting the ordering, the runtime statistics, and a notification based on the ordering to the client.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to managing personalized selection of machine learning (ML) pipelines based on user preferences of multiple criteria such as training cost, inferred speed of execution, accuracy, and training speed. Embodiments of the invention include identifying, for a user that requests to execute a ML pipeline on a dataset, a set of ML pipelines from a pipeline repository based on a domain of the dataset, performing runtime statistics on the identified set using a pre-trained prediction model, presenting, to the user, an ordering of the ML pipelines based on the highest ranking of the ML pipelines in either previously-preferred criteria (e.g., training cost or inferred speed) or a default criteria, and obtaining a selection that specifies a selected ML pipeline. Embodiments of the invention may further include updating the user preferences based on the selection and updating the prediction model based on real-life execution data of the selected ML pipeline.

Figure 1:
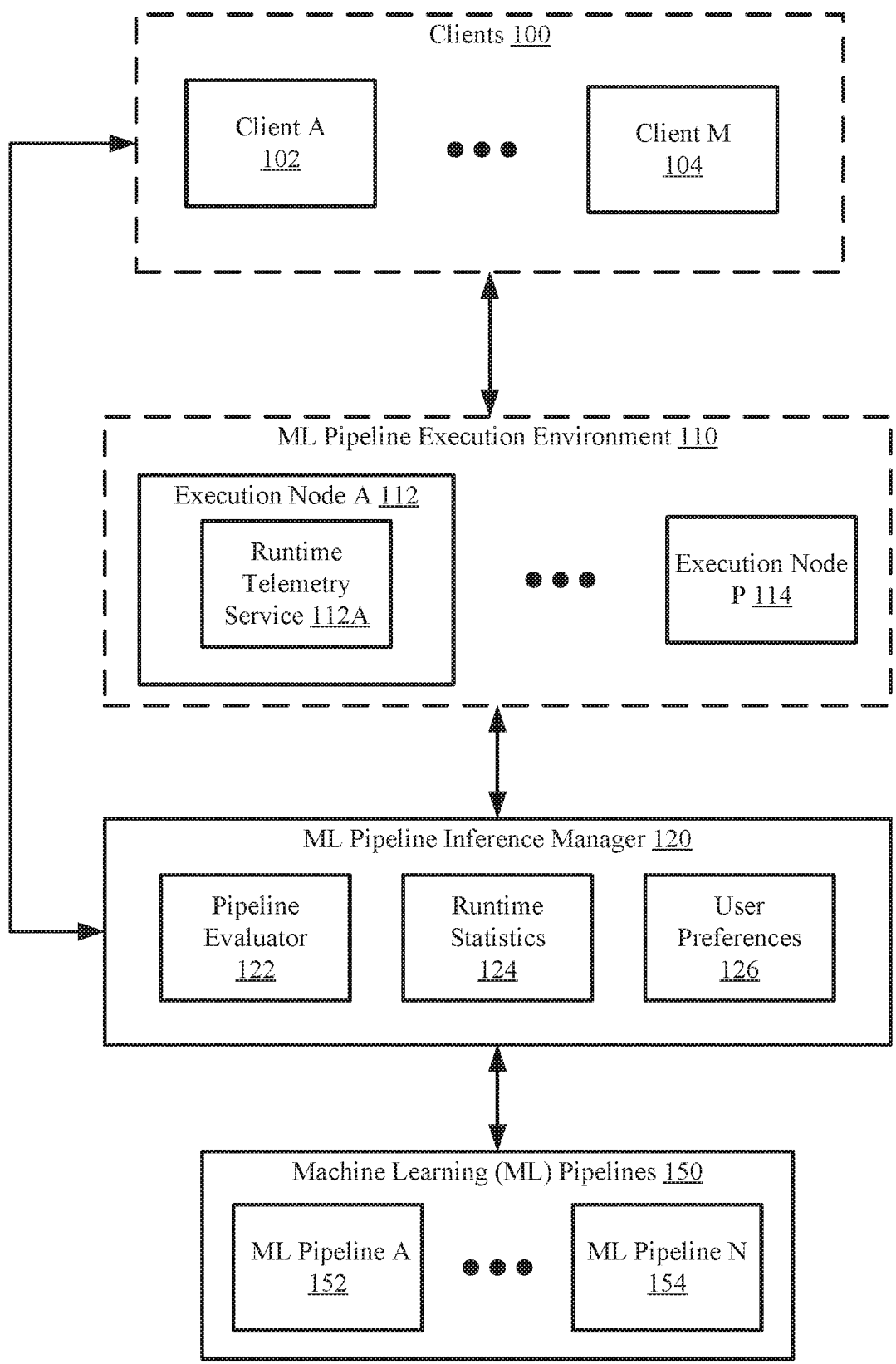
FIG. 1 shows a diagram of a system in accordance with one or more embodiments of the invention.

FIG. 1 shows a diagram of a system in accordance with one or more embodiments of the invention. The system may include one or more clients (100), a ML pipeline execution environment (110), a ML pipeline inference manager (120), and ML pipelines (150). The system may include additional, fewer, and/or different components without departing from the invention. Each component may be operably connected to any of the other components via any combination of wired and/or wireless connections. Each of the aforementioned components is discussed below.

In one or more embodiments of the invention, the client(s) (100) utilize services provided by the ML execution environment (110), and/or the ML pipeline inference manager (120). Specifically, the client(s) (100), each operated by one or more users, may initiate execution of ML pipelines in the ML pipeline execution environment (110). ML pipelines to be executed may be selected using the ML pipeline inference manager (120). A client (e.g., client A (102) or client M (104)) may send a request to execute a ML pipeline and send any relevant data associated with the request to obtain a selection of ML pipelines. The client (102, 104) may select, from the selection, a ML pipeline and, after obtaining the pipeline, initiate execution of the ML pipeline in the ML pipeline execution environment.

In one or more embodiments of the invention, a ML pipeline is a sequence of tasks that result in the generation of a trained machine learning model. Each ML pipeline specifies a ML algorithm and may result in a trained ML model based on a training dataset to which the ML algorithm is applied. In one or more embodiments of the invention, a ML algorithm is a series of one or more functions that specifies relationships between any number of inputs and outputs. Examples of ML algorithms include, but are not limited to: Linear Regression, Multi-Linear Regression, Logistic Regression, Decision Tree, SVM, Naive Bayes, kNN, K-Means, Random Forest, Dimensionality Reduction Algorithms, and Gradient Boosting algorithms.

Figure 4:
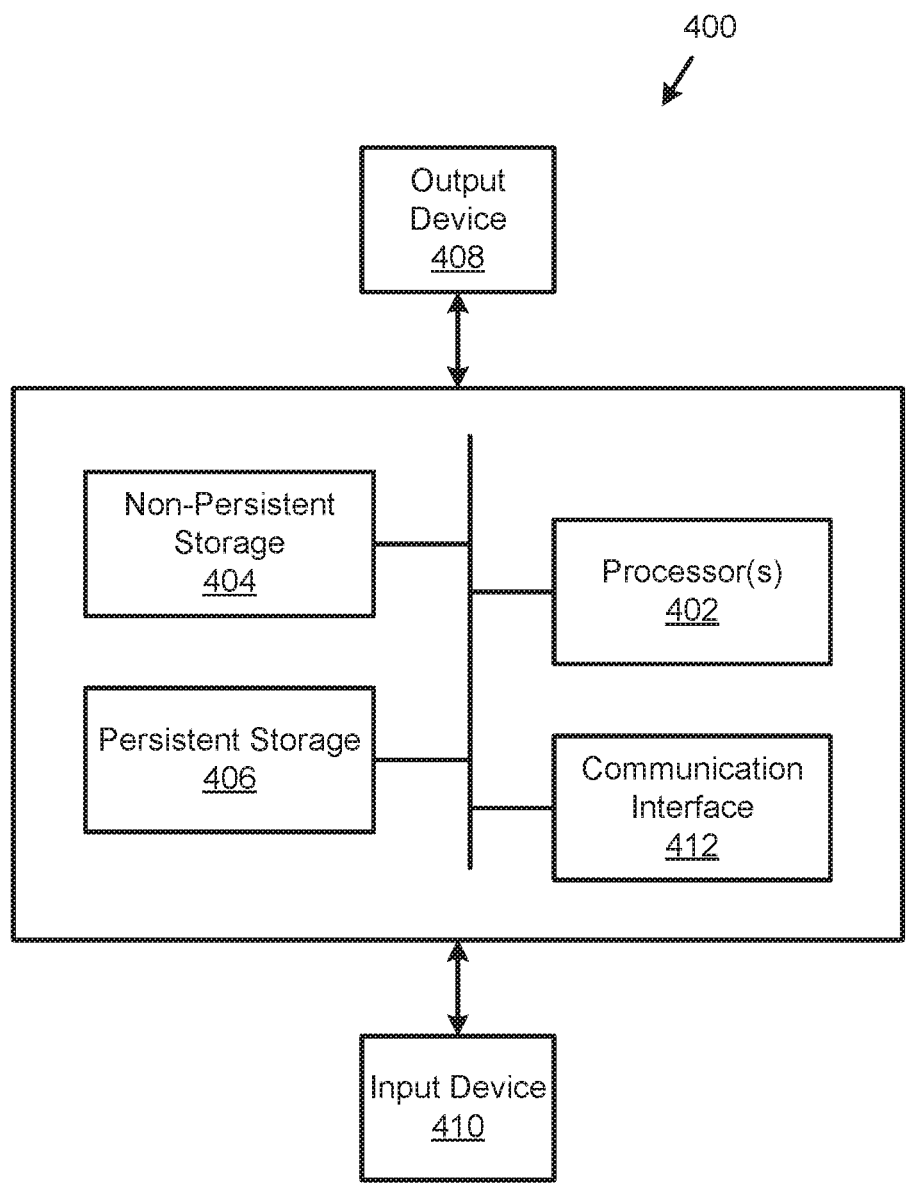
FIG. 4 shows a diagram of a computing device in accordance with one or more embodiments of the invention.

In one or more embodiments of the invention, a client (102, 104) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (102, 104) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the ML execution environment (110) includes execution nodes (112, 114) that execute ML pipelines and implement generated ML models. The execution nodes (112, 114) may include computing resources (e.g., processing, memory, storage) for performing such tasks.

In one or more embodiments of the invention, each execution node (102, 104) is part of an infrastructure in the ML pipeline execution environment (110). In one or more embodiments of the invention, an infrastructure is a deployment of execution nodes (112, 114) that are operatively connected via any combination of wired and/or wireless connections. Each execution node in an infrastructure may share applications, network services, ML pipelines, and/or other types of computer code without departing from the invention.

In one or more embodiments of the invention, each execution node (112, 114) further includes functionality for executing a runtime telemetry service (e.g., 112A). In one or more embodiments of the invention, the runtime telemetry service (112A) monitors the behaviors of executed ML pipelines to obtain ML pipeline telemetry. In one or more embodiments of the invention, the ML pipeline telemetry is real-life measurements of predicted behavior of the ML pipelines. Examples of ML pipeline telemetry of a ML pipeline include, but are not limited to: time taken to train a training dataset, processing resource usage (e.g., central processing unit (CPU) usage, Graphics Processing Unit (GPU) usage, etc.) of the ML pipeline to train a ML model, time taken to generate results by a ML model of the ML pipeline, processing resource usage of the ML model to generate the results, and monetary cost used to execute the ML model. The ML pipeline telemetry may be sent to the ML pipeline inference manager (120) by the runtime telemetry service (112A).

In one or more of embodiments of the invention, the runtime telemetry service (112A) is implemented as computer instructions, e.g., computer code, stored on a persistent storage (e.g., of the execution node (112, 114)) that when executed by a processor of the execution node (112, 114) cause the execution node (112, 114) to provide the functionality of the runtime telemetry service (112A) described throughout this application.

In one or more embodiments of the invention, each execution node (112, 114) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the execution node (112, 114) described throughout this application.

In one or more embodiments of the invention, each execution node (112, 114) is implemented as a logical device. The logical device may utilize the computing resources of any number of computing devices and thereby provide the functionality of the execution node (112, 114) described throughout this application.

In one or more embodiments of the invention, the ML pipeline inference manager (120) includes functionality for executing a prediction model on a set of ML pipelines and evaluating the ML pipelines based on user preferences. To perform the aforementioned functionality, the ML pipeline inference manager (120) includes a pipeline evaluator (122), runtime statistics (124), and user preferences (126). The ML pipeline inference manager (120) may include additional, fewer, and/or different components without departing from the invention. Each of the aforementioned components are discussed below.

In one or more embodiments of the invention, the pipeline evaluator (122) implements a prediction model on one or more sets of ML pipelines. The prediction model may take as an input a variety of factors of a ML pipeline (e.g., 152, 154) to generate the runtime statistics (124) for each ML pipeline. Further, the pipeline evaluator (122) generates an ordering of evaluated ML pipelines based on the user preferences (126).

In one or more of embodiments of the invention, the pipeline evaluator (122) is implemented as computer instructions, e.g., computer code, stored on a persistent storage that when executed by a processor of the execution node (112, 114) cause the execution node (112, 114) to provide the functionality of the runtime telemetry service (112A) described throughout this application.

In one or more embodiments of the invention, the runtime statistics (124) are data structures that specify values related to the operation of each ML pipeline, where the particular values included in the data structure correspond to the predicted criteria of each ML pipeline. The criteria may be, for example, an accuracy of the ML pipeline, a training cost, a training speed, an inferred speed, and an inferred cost. The criteria may be other types of criteria without departing from the invention. The runtime statistics of each ML pipeline may be predicted by training and/or executing ML models associated with each ML pipeline using a standard dataset (discussed below) and inputting the results in a prediction model. Additional inputs to the prediction model may include, for example, a training dataset size, a size of the dataset, a number of dimensions of the data set (e.g., two dimensional images, three dimensional graphics, etc.), a number of hyper-parameters (discussed below) of the ML pipeline, a number of iterations performed during training, and/or other factors without departing from the invention.

In one or more embodiments of the invention, the accuracy of a ML pipeline is measured based on how similar the results of the ML pipeline are to real-life behavior. For example, a ML pipeline may be implemented to generate a linear regression model that simulates a behavior between two variables. The accuracy of the ML pipeline may be measured by comparing the linear regression model of the ML pipeline to data points for which the linear regression model is modelling. The difference between the data points and the linear regression model may be used to measure the accuracy of the ML pipeline.

In one or more embodiments of the invention, the training cost of the ML pipeline is a prediction for how much it will cost for the ML pipeline to train a training dataset. The training cost may be measured in, for example, computing resource cost (e.g., monetary cost to operate a number of computing devices to perform the training for a predicted amount of time). For example, a training cost may be measured in a unit of US dollars (USD) per training. The amount of USD may include, for example, the cost to power one or more central processing units (CPUs) that would be performing the training.

In one or more embodiments of the invention, the training speed is a prediction of the time it would take for the ML pipeline to train the training dataset. The time it would take can be measured in, for example, any combination of seconds (s), milliseconds (ms), minutes (m), and/or any other unit of time without departing from the invention.

In one or more embodiments of the invention, the inferred speed is a prediction of how long it would take for a ML model of a ML pipeline to generate results based on an input of data. The time it would take can be measured in, for example, any combination of seconds (s), milliseconds (ms), minutes (m), and/or any other unit of time without departing from the invention.

In one or more embodiments of the invention, the inferred cost is a prediction of the cost for executing the ML model after it has been trained. The inferred cost may be measured in, for example, computing resource cost (e.g., monetary cost to operate a number of computing devices that execute the ML model).

In one or more embodiments of the invention, the user preferences (126) are data structures that specify preferences of criteria of each user operating a client (102, 104) based on previously-selected ML pipelines. For example, user A (102) may have selected a ML pipeline primarily based on an inferred cost criteria. In this example, the user preferences (126) may specify that user A has a preference for selecting ML pipelines with a low inferred cost. The user preferences (126) may be used by the pipeline evaluator (122) when generating an ordering of a set of ML pipelines to be presented to the clients (102, 104) in response to requests by the clients (102, 104) to select a ML pipeline. In one or more embodiments of the invention, the user preferences (126) are based on a combination of: (i) a ranking of each criteria of each ML pipeline selected by the users and (ii) manual inputs by the corresponding users about their preferred criterion (or criteria) and/or an order of importance for the preferred criteria (if more than one).

In one or more embodiments of the invention, the ML pipeline inference manager (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the ML pipeline inference manager (120) described throughout this application and/or all, or a portion thereof, of the method illustrated in FIG. 2.

In one or more embodiments of the invention, the ML pipeline inference manager (120) is implemented as a logical device. The logical device may utilize the computing resources of any number of computing devices and thereby provide the functionality of the ML pipeline inference manager (120) described throughout this application and/or all, or a portion thereof, of the method illustrated in FIG. 2.

Figure 2:
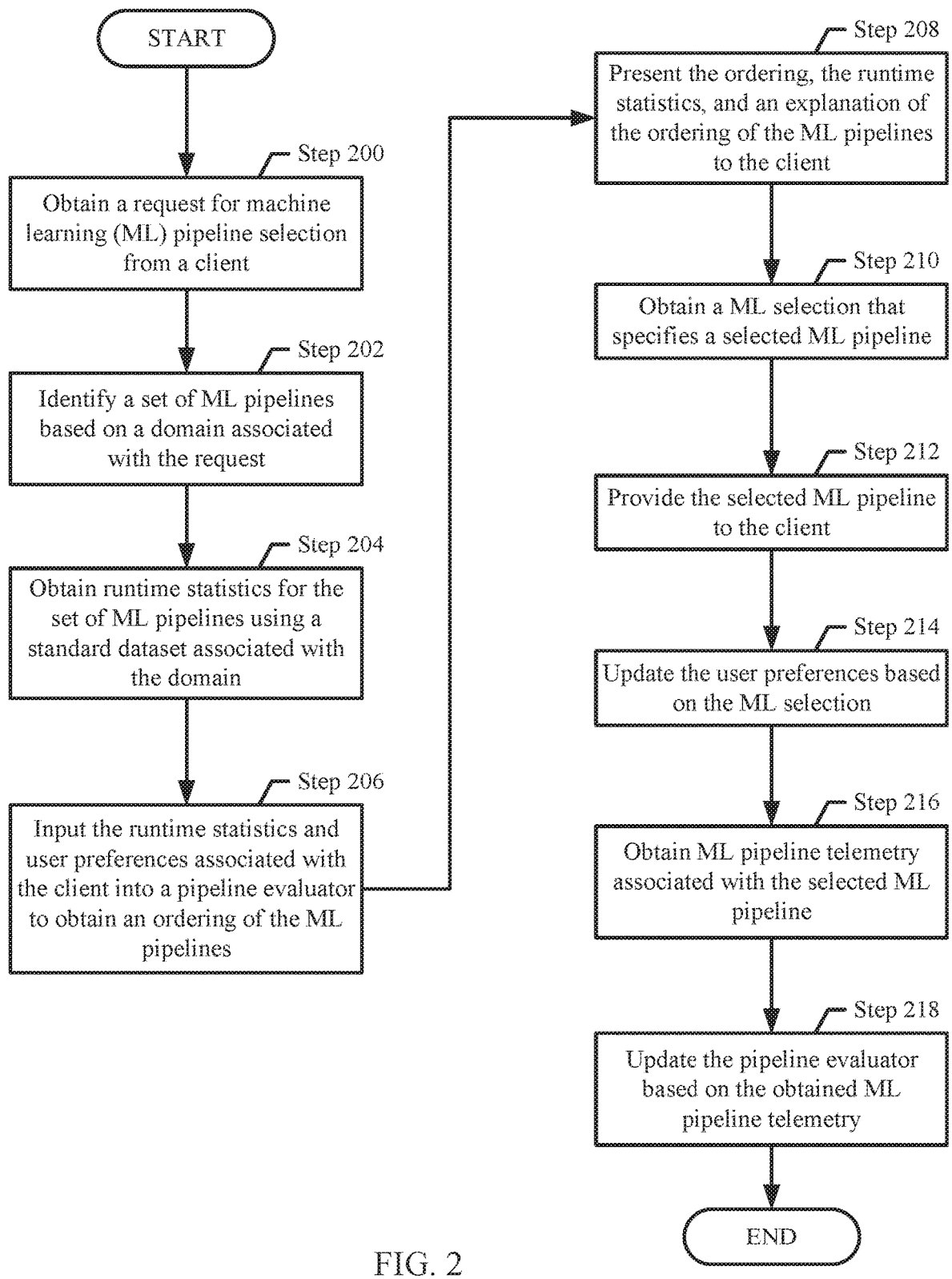
FIG. 2 shows a flowchart for generating a personalized machine learning (ML) pipeline selection in accordance with one or more embodiments of the invention.

In one or more embodiments of the invention, the ML pipelines (150) correspond to a set of pre-trained ML models that may be deployed onto an execution node(s) and used in accordance with FIG. 2. Thus, each ML pipeline corresponds to a pre-trained ML model. The ML pipelines may be obtained from clients and/or for other third-party systems and/or repositories. The ML pipelines (152, 154), executing on an execution node, may be accessed by the ML pipeline inference manager (120) when generating runtime statistics (124) and/or when providing the ML pipelines (152, 154) to the clients (100) in response to a ML selection by the client (102).

FIG. 2 shows a flowchart for servicing backup requests in accordance with one or more embodiments of the invention. The method shown in FIG. 2 may be performed by, for example, a ML pipeline inference manager (120, FIG. 1). Other components of the system illustrated in FIG. 1 may perform the method of FIG. 2 without departing from the invention.

While the various steps in the flowcharts are presented and described sequentially, one of ordinary skill in the relevant art will appreciate that some or all of the steps may be executed in different orders, may be combined or omitted, and some or all steps may be executed in parallel.

Turning to FIG. 2, in step 200, a request for a ML pipeline selection is obtained. In one or more embodiments of the invention, the request specifies the client and a domain of the training dataset that is to be used to train a ML model. The request may be associated with a user operating the client. The user may utilize a user interface (discussed below) when generating and/or sending the request to the ML pipeline inference manager.

The request may further include the training dataset. The training dataset may be stored locally on the client or in storage that is separate from the client. In such embodiment where the training dataset is stored in storage that is separate from the client, the request may specify a reference (e.g., storage location) that may be used to obtain the training dataset. The request may include different and/or additional information without departing from the invention.

In one or more embodiments of the invention, a domain is a type of data that is to be used for training and calculating by the ML pipelines. Data of a domain may share characteristics such as, for example, dimensions, number of variables, an industry associated with the data, and/or any other characteristics of the data without departing from the invention. Examples of various domains may include, but are not limited to, images, traffic data, consumer data, three-dimensional graphics, video footage, and financial transactions.

In step 202, a set of ML pipelines are identified based on the domain specified in the request. In one or more embodiments of the invention, the set of ML pipelines are selected based on the type of ML algorithms that are designed to generate ML models for the domain of the training dataset. For example, the training dataset may include images. The ML pipeline inference manager may identify ML algorithms that are associated with classifying images and/or being trained using images and identify the ML pipelines that implement those ML algorithms.

In step 204, runtime statistics for the set of ML pipelines are obtained. In one or more embodiments of the invention, the runtime statistics are generated by training each ML pipeline in the set using a standard dataset (either provided by the client or included with the pipeline evaluator). If a ML pipeline has been previously trained using the standard dataset, additional training may not be performed for such ML pipeline.

After the ML pipelines have been trained to obtain ML models, training results are obtained based on measurements performed for each ML model as the ML model is trained and/or executed. The training results may specify values for the criteria while training and/or executing the ML models using the standard dataset. For example, training speed and/or training cost may be calculated during the training of the ML models using the standard dataset and stored as training results.

The training results may be input to a prediction model. The prediction model may be trained using a prediction model training dataset. The prediction model training dataset may include data points that correlate the training results to predicted results. For example, the data points in the prediction model training dataset may specify a correlation between a training speed (e.g., two minutes) of the standard dataset and a training speed (e.g., eight minutes) of a training dataset of a larger size (e.g., a training data set that the client may provide to the ML pipeline). The prediction model may take as inputs the training results as well as additional characteristics of the ML pipelines that may factor into the predicted values of the criteria. The characteristics may include, for example, a size of the training dataset, a number of dimensions of the training dataset, a number of hyper-parameters of the ML algorithm associated with the ML pipeline, an infrastructure in which the ML pipeline would be executing, and/or any other characteristics without departing from the invention.

In one or more embodiments of the invention, a hyper-parameter is a configuration of a ML model that can be tuned prior to training. The hyper-parameters may be unique to each ML algorithm. For example, a logistic regression algorithm may include hyper-parameters such as tolerance, intercepts, bias, and class weights. A Random Forest algorithm may include hyper-parameters such as maximum tree depth, minimum number of samples, minimum weighted fractions, and maximum number of leaves.

In one or more embodiments of the invention, the infrastructure in which the ML pipelines would be executing would be specified by the user (e.g., in the request). Alternatively, the infrastructure is determined by the ML pipeline inference manager based on, for example, previous executions of ML pipelines by the client.

In one or more embodiments of the invention, the training and/or execution of the ML models in the set of ML models may be performed in the ML pipeline execution environment discussed in FIG. 1 and/or in a third-party execution environment without departing from the invention.

In step 206, the runtime statistics and the user preferences associated with the client are input into a pipeline evaluator to obtain an ordering of the ML pipelines. In one or more embodiments of the invention, the pipeline evaluator inputs the generated runtime statistics with the user preferences to a user preference model to identify the highest ranking ML pipelines in the set of ML pipelines based on preferred user preferences of the user operating on the client.

For example, the user preferences of a user may specify that the user has previously preferred inferred cost and accuracy when selecting ML pipelines. The runtime statistics of each ML pipeline in the set of ML pipelines is input to the user preference model along with a client identifier of the client. As a result, an ordering of the ML pipelines is produced with the ML pipelines that ranked highest in inferred cost ordered first. For ML pipelines with similar inferred costs, the ML pipelines would be further ordered based on accuracy.

In step 208, the ordering, the runtime statistics, and an explanation of the ordering of the ML pipelines are presented to the client. In one or more embodiments of the invention, the ordering, the runtime statistics, and the explanation of the ordering may be presented using an interface between the client and the user operating the client. Additional information associated with the ML pipelines (e.g., proprietary information, estimated time to transfer to the execution environment, etc.) may be further presented using the interface without departing from the invention. Examples of the interface include, but are not limited to, a command line interface (CLI), a graphical user interface (GUI), a menu driven interface (MDI), and a natural language interface (NLI).

In one or more embodiments of the invention, the explanation of the ordering of the ML pipelines is presented as a notification that notifies the client of the basis for generating the ordering. The explanation may specify the user preferences used to make a determination about the ordering and the criterion (or criteria) on which the ordering is based. The notification may further specify how the user preferences were obtained (e.g., based on ranking of criteria of previously selected ML pipelines, based on manual input by the user, etc.).

In one or more embodiments of the invention, the presentation of the ordering, runtime statistics, and the explanation may enable the client to display the runtime statistics to the user and may enable the user to select the ML pipeline to be used. For example, a GUI on the client may display the ordering of the ML pipelines, and the runtime statistics may be displayed after a user chooses (e.g., via a click) one ML pipeline to view its runtime statistics.

In one or more embodiments of the invention, the ordering and the runtime statistics are displayed in a table, where each row is associated with a ML pipeline, and the runtime statistics are displayed for each ML pipeline. The order of the rows are displayed based on the ordering.

In one or more embodiments of the invention, steps 204, 206, and 208 are performed concurrently. The runtime statistics of a ML pipeline may be presented to the clients and updated for other ML pipelines as the respective runtime statistics are calculated. In this manner, the user does not have to wait until the runtime statistics for all ML pipelines in the set of ML pipelines are generated.

In step 210, a ML selection that specifies a selected ML pipeline is obtained. In one or more embodiments of the invention, the ML selection is a message from the client that requests the selected ML pipeline.

In step 212, the selected ML pipeline is provided to the client to be deployed in the ML execution environment. In one or more embodiments of the invention, the ML pipeline inference manager obtains the selected ML pipeline from a storage location of the ML pipeline (e.g., a third party system and/or repository) and sends the selected ML pipeline to the client and/or to the ML execution environment to be deployed by the client.

In step 214, the user preferences are updated based on the ML selection. In one or more embodiments of the invention, the user preferences are stored by updating the user preferences associated with the client based on a highest ranking criteria of the selected ML pipeline. The user preferences is updated to specify the client and the most recent criteria predicted to be preferred by the client. The criteria of each ML pipeline may be ranked relative to the criteria of the other ML pipelines in the set of ML pipelines. For example, for a criterion of inferred speed, the ML pipelines with the highest inferred speeds will be ranked higher than the ML pipelines with lower inferred speeds. The ranking of each criterion for each ML pipeline may be represented as a numerical value (e.g., a percentage, a rank number, etc.). In such embodiments, the ML pipeline inference manager notifies the client of the updates to the user preferences and further specifies an explanation behind how the user preferences were updated (e.g., based on the ranking of the criterion (or criteria) for the selected ML pipeline).

For example, consider a scenario in which user A has selected ML pipeline A. ML pipeline A may rank as number one in training cost relative to the other ML pipelines in the set of ML pipelines (e.g., ML pipeline A costs less than the other ML pipelines to train). The user preferences may specify that user A has a preference for the training cost criterion. This information may be used in future iterations of the method of FIG. 2 when determining a future ordering of the ML pipelines for user A. Further, user A is notified, via a client, that the user preferences were updated based on the high ranking of training cost for ML pipeline A.

In one or more embodiments of the invention, the user preferences are updated based on input obtained by the user (e.g., in the request or after execution of the selected ML pipeline). The user may specify one or more preferred criteria and/or an order of importance for each preferred criteria (if more than one).

While not discussed in step 208, the aforementioned ranking of the criteria for each ML pipeline may be presented to the client in step 208 for use when selecting a ML pipeline without departing from the invention.

Returning to the discussion of FIG. 2, in step 216, ML pipeline telemetry associated with the selected pipeline is obtained. In one or more embodiments of the invention, after the ML pipeline is provided to the client, the client may execute the ML pipeline in a ML execution environment. This may include implementing the ML pipeline on one or more execution nodes in the ML execution environment. During the execution of the ML pipeline (e.g., while implementing a ML algorithm of the ML pipeline on the training dataset to generate a ML model), a runtime telemetry service executing on each of the execution nodes may record real-time measurements of the ML pipeline and send the real-time measurements to the ML pipeline inference manager as ML pipeline telemetry.

In step 218, the pipeline evaluator is updated based on the obtained ML pipeline telemetry. In one or more embodiments of the invention, the prediction model executed by the pipeline evaluator is updated with the obtained telemetry to improve the prediction model for future iterations of the method of FIG. 2.

EXAMPLE

Figure 3A:
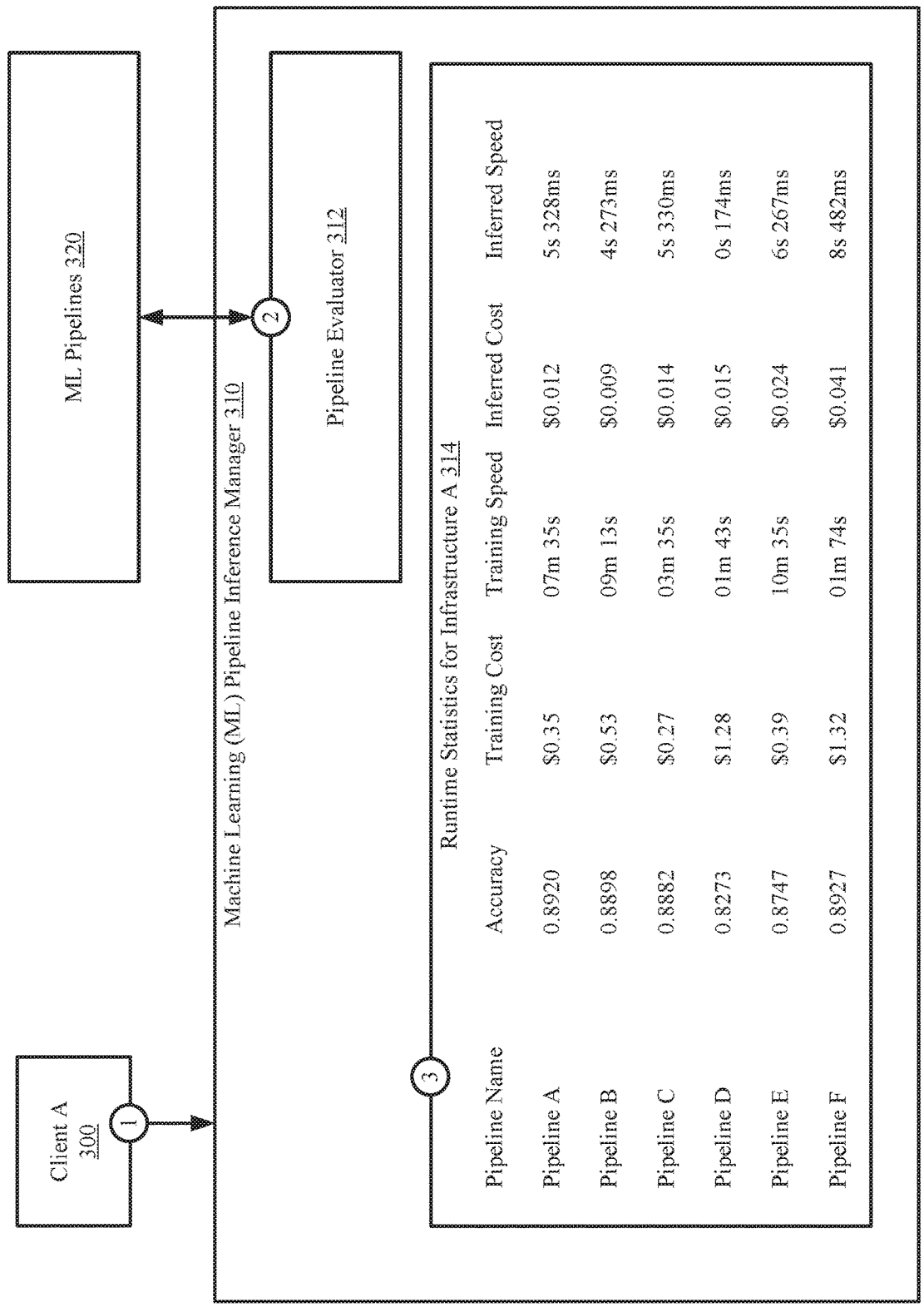
FIG. 3A-3C show an example in accordance with one or more embodiments of the invention.
Figure 3B:
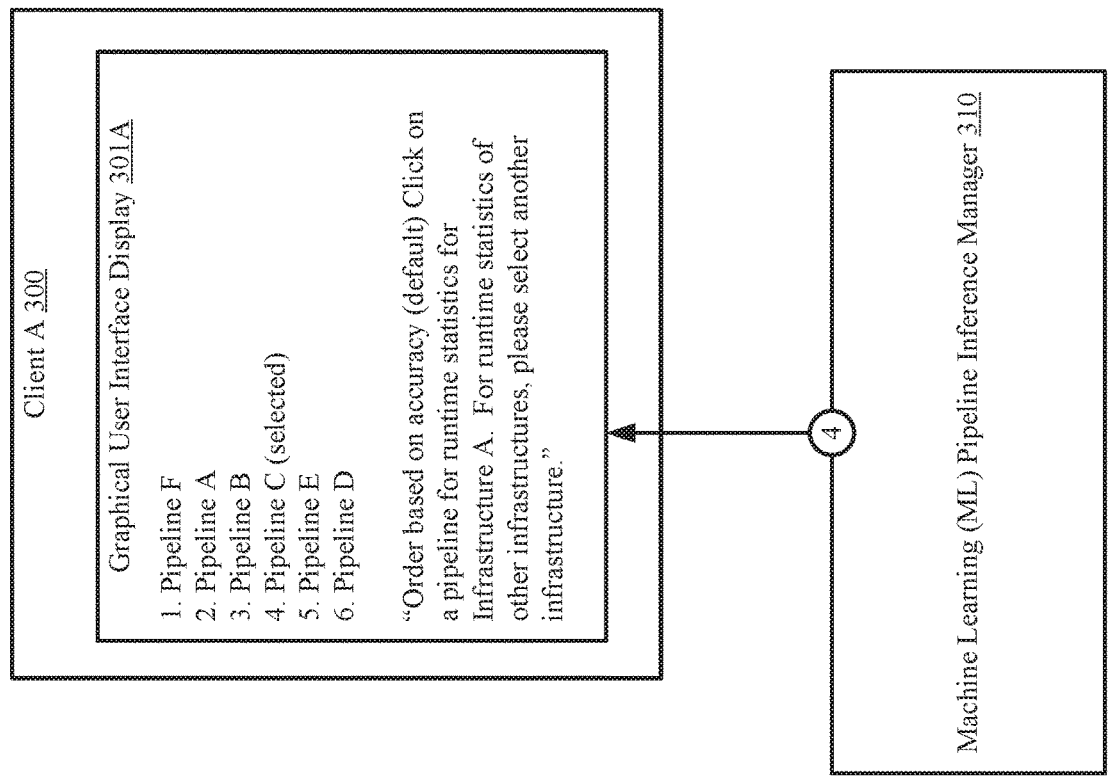
Figure 3C:
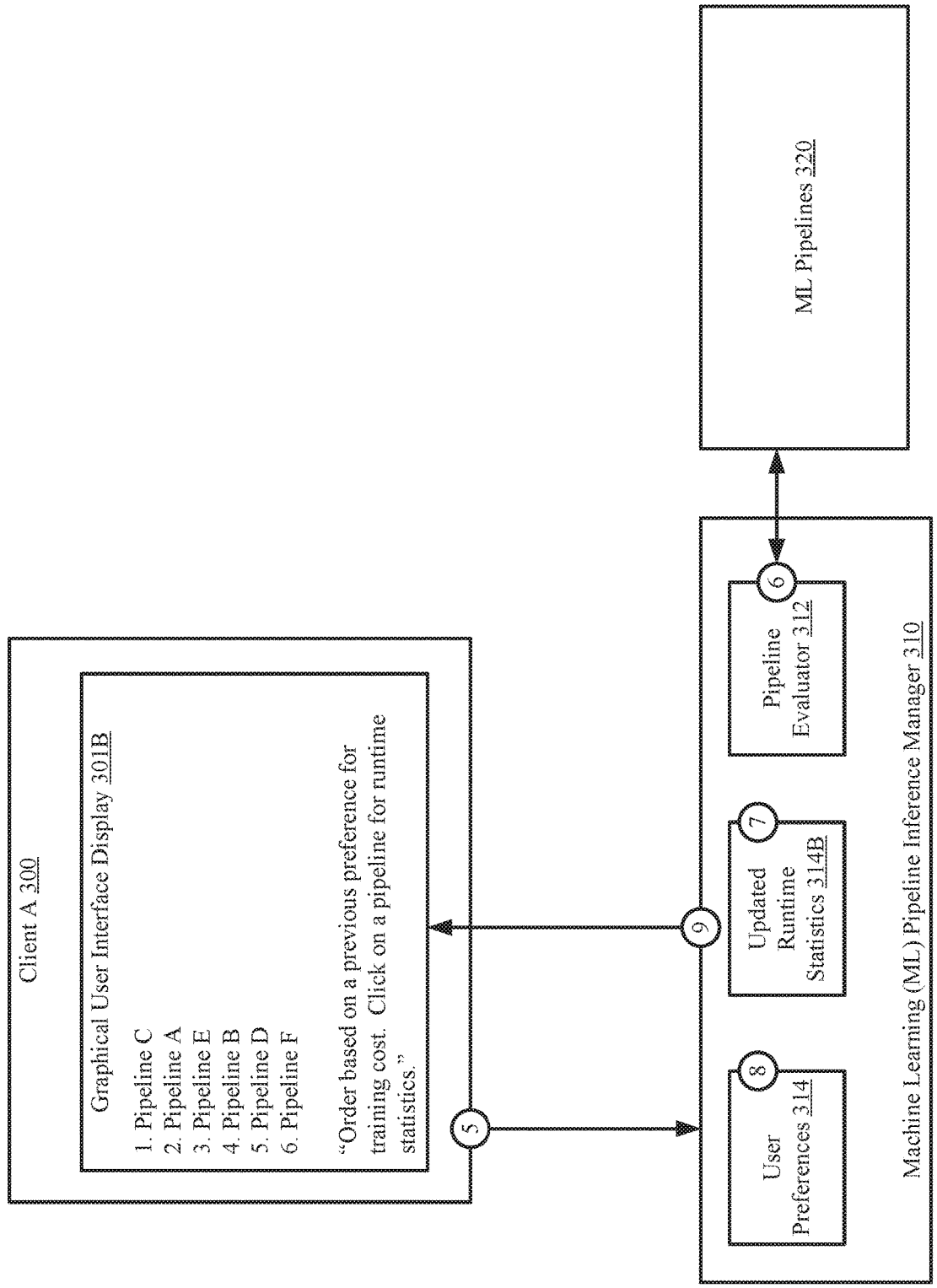

The following section describes an example. The example, illustrated in FIGS. 3A-3C, is not intended to limit the invention. Turning to the example, consider a scenario in which a client is intending to execute a ML pipeline that includes generating a ML model that predicts future customers purchasing a good on an electronic commerce (e-commerce) website.

FIG. 3A shows an example system. The example system includes a client (300), a ML pipeline inference manager (310), and a ML pipelines (320). The client (300) may send a request to the ML pipeline inference manager (310) that includes the training dataset that is to be used for generating the ML model [1]. The training dataset may be associated with a forecasting domain. The forecasting domain is characterized by data points with multiple inputs (e.g., time of day, popularity of the good in the e-commerce website, season in the year, etc.) and a single output (the number of customers). Further, the request specifies the infrastructure (e.g., infrastructure A) in which the client expects to execute the ML pipeline.

Based on the request, the ML pipeline inference manager (310) identifies Ml pipelines in the ML pipelines (320) that are designed to generate a ML model for the forecasting domain. Each of the identified ML pipelines is processed using a prediction model that is trained using a standard dataset that includes data points that specify inputs such as the type of ML algorithm of the ML pipeline, a number of hyper-parameters associated with the ML pipeline, a size of the training dataset, a number of dimensions of the training dataset, a number of inputs, and a number of outputs. The outputs of the data points in the standard dataset include the following criteria: accuracy, training cost, training speed, inferred cost, and inferred speed.

The inputs associated with each ML pipeline are input to the prediction model by a pipeline evaluator (312) of the ML pipeline inference manager (310) in accordance with FIG. 2. The results of this input are runtime statistics associated with the identified ML pipelines for infrastructure A (314). At this point in time, client A (300) has not previously used the ML pipeline inference manager (310) to select a ML pipeline.

FIG. 3B shows a second diagram of the example system. An ordering is generated for client A (300) and sent to client A (300) with the generated runtime statistics and an explanation of the ordering [4]. The explanation specifies that the ordering is based on a default criteria of accuracy, with Pipeline F having the highest accuracy listed first and Pipeline D having the lowest accuracy being listed last. Client A selects Pipeline C to implement. The ordering and the runtime statistics are displayed in a GUI display (301B) of the client (300).

In one or more embodiments of the invention, the selection of Pipeline C is used to generate user preferences (illustrated in FIG. 3C). Specifically, an analysis of Pipeline C is performed to identify the highest ranking criterion (or criteria) of Pipeline C. Based on the analysis, it is determined that Pipeline C has the lowest training cost out of the set of ML pipelines that were evaluated. As a result, the client reference for the training cost criterion is stored by the ML pipeline inference manager (310).

Though not shown in FIG. 3B, the ML pipeline inference manager (310) sends Pipeline C to the client to be executed on Infrastructure A. ML pipeline telemetry are obtained from execution nodes in Infrastructure A and used to improve the prediction model.

FIG. 3C shows a third diagram of the example system. Client A (300) sends a second request to obtain a ML pipeline that performs a similar prediction as the first request with a new training dataset of the forecasting domain [5]. The ML pipeline inference manager (310) identifies a set of ML pipelines each designed to generate ML models for the forecasting domain [6]. The pipeline evaluator (312) inputs the relevant characteristics of the set of ML pipelines into the updated prediction model to generate the updated runtime statistics (314) [7].

The updated runtime statistics are input into a user preference model with user preferences (314) that specify client A's preference for the training cost criterion [8] to generate a second ordering of the set of ML pipelines. The second ordering, the updated runtime statistics (314B), and a second explanation of the second ordering is presented to client A (310) using a second GUI display (301B). The second explanation specifies that the second ordering is based on client A's preference for training cost, and orders the set of pipelines from lowest training cost (i.e., pipeline C) to highest training cost (i.e., pipeline F).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of the components illustrated in FIG. 4 is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the current evaluations of machine learning algorithms. Embodiments of the invention enhance the current evaluations by increasing the number of criteria used in prediction models from only one criterion such as accuracy as current evaluations implement.

Further, embodiments of the invention provide transparency with the evaluation of the ML models. Embodiments of the invention provide an explanation of a personalized ordering of ML pipelines provided to users (e.g., via a user interface) requesting to execute a ML pipeline. The explanation may be based on user preferences that are based on previous selections of ML pipelines.

Thus, embodiments of the invention may address the problem of inefficient use of computing resources. This problem arises due to the technological nature of the environment in which ML pipeline executions are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a machine learning (ML) execution environment, a request for a ML pipeline selection from a client, wherein the request comprises a training dataset and a domain of the training dataset; and
in response to the request:
identifying a set of ML pipelines based on the domain;
generating, by an execution node of the ML execution environment, runtime statistics for the set of ML pipelines using the domain and at least a portion of the training dataset, wherein generating the runtime statistics comprises:

performing a training on one of the set of ML pipelines using the at least a portion of the training dataset to generate a ML model;
executing the ML model on the training dataset; and
tracking performance of the ML model and of the training, wherein the runtime statistics specifies the performance;
generating, using a user preference model, a first ordering of the set of ML pipelines based on the runtime statistics and user preferences; and
presenting the first ordering, the runtime statistics, and a first notification based on the first ordering to the client;
obtaining, in response to the presenting, a ML selection that specifies a selected ML pipeline of the set of ML pipelines;
providing the selected ML pipeline to the client;
updating the user preferences based on the ML selection to obtain updated user preferences;
after obtaining the selected ML pipeline, executing the selected ML pipeline in a ML execution environment to generate a trained machine learning model;
after updating the user preferences:
obtaining a second request for a second ML pipeline selection from the client, wherein the second request comprises the training dataset and the domain of the training dataset;
in response to the second request:
generating, using the user preference model, a second ordering of the set of ML pipelines based on the runtime statistics and the updated user preferences;
presenting the second ordering, the runtime statistics, and a second notification based on the second ordering to the client; and
obtaining, in response to the presenting the second ordering, the runtime statistics, and the second notification based on the second ordering to the client, a second selection that specifies a second selected ML pipeline of the set of ML pipelines.

2. The method of claim 1, wherein obtaining the runtime statistics for the set of ML pipelines comprises:
providing inputs of each ML pipeline in the set of ML pipelines into a prediction model to generate the runtime statistics.

3. The method of claim 2, wherein the inputs comprise at least one of: a size of the training dataset, a type of ML algorithm associated with each ML pipeline, a number of hyper-parameters of each ML pipeline, and a standard dataset.

4. The method of claim 2, wherein the runtime statistics comprise a plurality of criteria: and wherein the criteria comprise at least one of: an accuracy, a training cost, a training speed, an inferred cost and an inferred speed of each ML pipeline.

5. The method of claim 2, further comprising:
obtaining ML pipeline telemetry associated with execution of the selected ML pipeline; and
updating the prediction model based on the ML pipeline telemetry.

6. The method of claim 5, wherein the ML pipeline telemetry is obtained from a ML pipeline execution environment in which the selected ML pipeline is executing.

7. A system, comprising:
a processor; and
memory comprising instructions which, when executed by the processor, perform a method, the method comprising:
obtaining a request for a machine learning (ML) pipeline selection from a client, wherein the request comprises a training dataset and a domain of the training dataset; and
in response to the request:
identifying a set of ML pipelines based on the domain;
generating runtime statistics for the set of ML pipelines using the domain and at least a portion of the training dataset, wherein generating the runtime statistics comprises:
performing a training on one of the set of ML pipelines using the at least a portion of the training dataset to generate a ML model;
executing the ML model on the training dataset; and
tracking performance of the ML model and of the training, wherein the runtime statistics specifies the performance;
inputting the runtime statistics and user preferences associated with the client into a user preference model to obtain a first ordering of the set of ML pipelines; and
presenting the first ordering, the runtime statistics, and a notification based on the first ordering to the client;
obtaining, in response to the presenting, a ML selection that specifies a selected ML pipeline of the set of ML pipelines;
providing the selected ML pipeline to the client;
updating the user preferences based on the ML selection to obtain updated user preferences;
after obtaining the selected ML pipeline, executing the selected ML pipeline in a ML execution environment to generate a trained machine learning model;
after updating the user preferences:
obtaining a second request for a second ML pipeline selection from the client, wherein the second request comprises the training dataset and the domain of the training dataset; and
in response to the second request:
generating, using the user preference model, a second ordering of the set of ML pipelines based on the runtime statistics and the updated user preferences;
presenting the second ordering, the runtime statistics, and a notification based on the second ordering to the client; and
obtaining, in response to the presenting the first ordering, the runtime statistics, and a notification based on the second ordering to the client, a second selection that specifies a second selected ML pipeline of the set of ML pipelines.

8. The system of claim 7, wherein obtaining the runtime statistics for the set of ML pipelines comprises:
providing inputs of each ML pipeline in the set of ML pipelines into a prediction model to generate the runtime statistics.

9. The system of claim 8, wherein the inputs comprise at least one of: a size of the training dataset, a type of ML algorithm associated with each ML pipeline, a number of hyper-parameters of each ML pipeline, and a standard dataset.

10. The system of claim 8, wherein the runtime statistics comprise a plurality of criteria: and wherein the criteria comprise at least one of: an accuracy, a training cost, a training speed, an inferred cost and an inferred speed of each ML pipeline.

11. The system of claim 8, further comprising:
obtaining ML pipeline telemetry associated with execution of the selected ML pipeline; and
updating the prediction model based on the ML pipeline telemetry.

12. The system of claim 11, wherein the ML pipeline telemetry is obtained from a ML pipeline execution environment in which the selected ML pipeline is executing.

13. A non-transitory computer readable medium comprising computer readable program code, which when executed by a computer processor enables the computer processor to perform a method for managing data, the method comprising:
obtaining a request for a machine learning (ML) pipeline selection from a client, wherein the request comprises a training dataset and a domain of the training dataset; and
in response to the request:
identifying a set of ML pipelines based on the domain;
generating runtime statistics for the set of ML pipelines using the domain and at least a portion of the training dataset, wherein generating the runtime statistics comprises:
performing a training on one of the set of ML pipelines using the at least a portion of the training dataset to generate a ML model;
executing the ML model on the training dataset; and
tracking performance of the ML model and of the training, wherein the runtime statistics specifies the performance;
inputting the runtime statistics and user preferences associated with the client into a user preference model to obtain a first ordering of the set of ML pipelines; and
presenting the first ordering, the runtime statistics, and a notification based on the first ordering to the client;
obtaining, in response to the presenting a ML selection that specifies a selected ML pipeline of the set of ML pipelines;
providing the selected ML pipeline to the client;
updating the user preferences based on the ML selection to obtain updated user preferences;
after obtaining the selected ML pipeline, initiating, by the client, execution of the ML pipeline in a ML execution environment to generate a trained machine learning model;
after updating the user preferences:
obtaining a second request for a second ML pipeline selection from a client, wherein the second request comprises the training dataset and the domain of the training dataset;
in response to the request:
generating, using the user preference model, a second ordering of the set of ML pipelines based on the runtime statistics and the updated user preferences;
presenting the first ordering, the runtime statistics, and a notification based on the second ordering to the client; and
obtaining, in response to the presenting the first ordering, the runtime statistics, and a notification based on the second ordering to the client, a second selection that specifies a second selected ML pipeline of the set of ML pipelines.

14. The non-transitory computer readable medium of claim 13, wherein obtaining the runtime statistics for the set of ML pipelines comprises:
providing inputs of each ML pipeline in the set of ML pipelines into a prediction model to generate the runtime statistics.

15. The non-transitory computer readable medium of claim 14, wherein the inputs comprise at least one of: a size of the training dataset, a type of ML algorithm associated with each ML pipeline, a number of hyper-parameters of each ML pipeline, and a standard dataset.

16. The non-transitory computer readable medium of claim 14, wherein the runtime statistics comprise a plurality of criteria: and wherein the criteria comprise at least one of: an accuracy, a training cost, a training speed, an inferred cost and an inferred speed of each ML pipeline.

17. The non-transitory computer readable medium of claim 14, further comprising:
obtaining ML pipeline telemetry associated with execution of the selected ML pipeline; and
updating the prediction model based on the ML pipeline telemetry.

* * * * *